Figure 1:
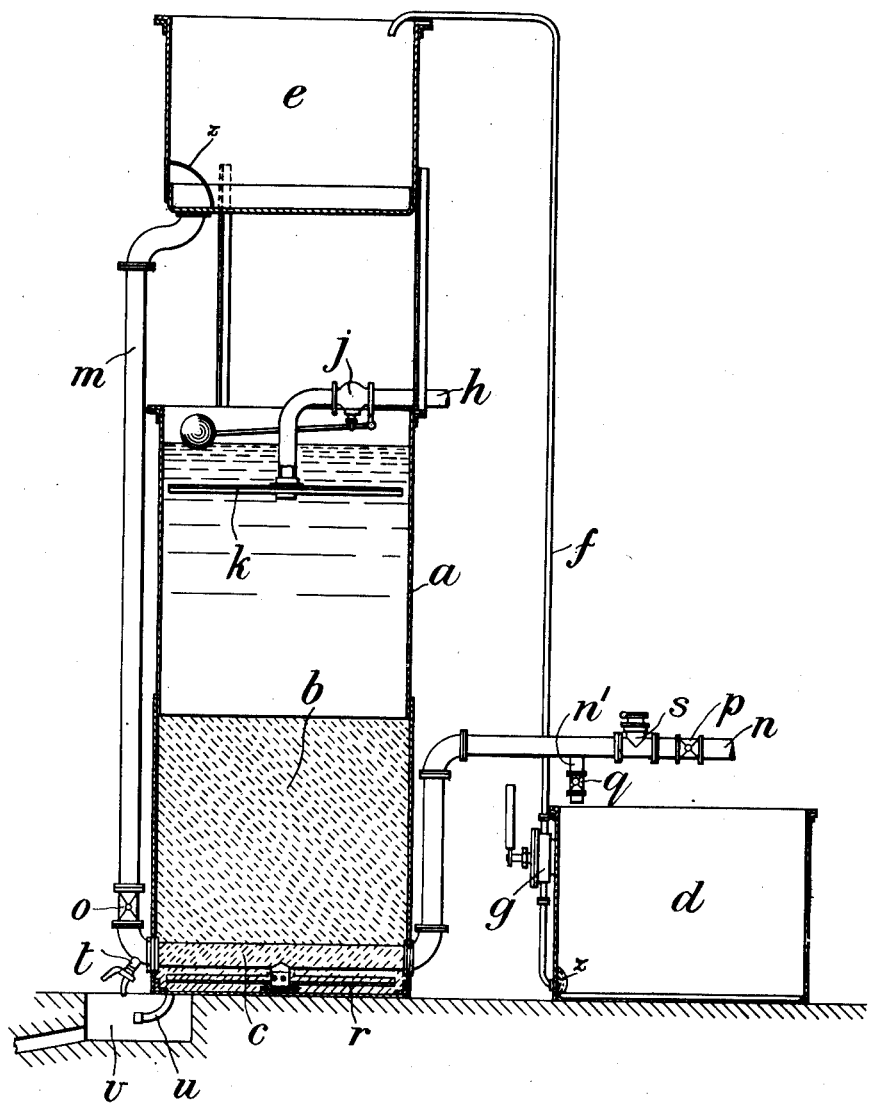

H. J. WHEATON.
MEANS FOR SOFTENING WATER.
APPLICATION FILED FEB. 7, 1914.

1,100,803.

Patented June 23, 1914.

2 SHEETS—SHEET 1.

WITNESSES:
John C. Sanders
M. B. Cottrell

INVENTOR:
Harold Joseph Wheaton
BY M. Wallace White
ATT'Y

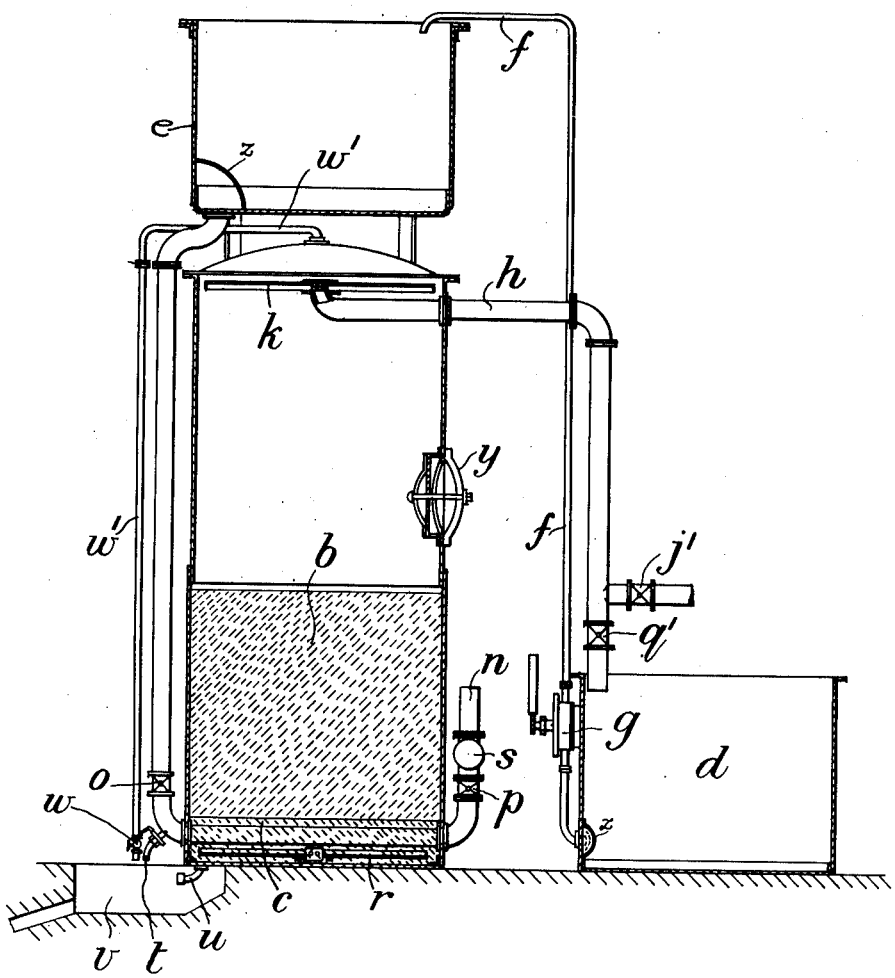

UNITED STATES PATENT OFFICE.

HAROLD JOSEPH WHEATON, OF SPONDON, NEAR DERBY, ENGLAND.

MEANS FOR SOFTENING WATER.

1,100,803.  Specification of Letters Patent.  Patented June 23, 1914.

Application filed February 7, 1914. Serial No. 817,135.

*To all whom it may concern:*

Be it known that I, HAROLD JOSEPH WHEATON, a subject of the King of Great Britain, residing at Spondon, near Derby, England, have invented new and useful Improvements in Means for Softening Water, of which the following is a specification.

This invention relates to apparatus for softening water of the type in which the softening substances compound or mixture such as zeolites employed in the apparatus is or are regenerated by passing a solution of salt through the said substance compound or mixture, whereby mixed chlorids are formed, and causing said substance or mixture to be agitated.

The object of this invention is to provide improved means for regenerating the said substance, compound or mixture.

In processes and apparatus hitherto devised it has been proposed to agitate the substance by a stirring device, and it has been proposed to agitate the salt solution during its passage through the substance.

According to this invention the means for regenerating the softening substance, compound or mixture, is characterized in that the said substance, compound or mixture, is agitated by the passage of the salt solution upwardly therethrough at the commencement of the regeneration, before the said solution passes slowly downwardly in the well known manner through the said substance, compound or mixture.

Referring to the drawings:—Figure 1 is a diagram showing one form of apparatus made in accordance with this invention and adapted for use as a gravity system. Fig. 2 is a diagram showing another form of apparatus adapted for use as a pressure system.

Referring to Fig. 1 of the drawings, $a$ is a steel tank, $b$ is a bed of softening substance, compound or mixture, $c$ is a thin layer of gravel, $d$ and $e$ are salt tanks, the former being on the ground and the latter supported above the filter, $f$ is a pipe through which the salt solution is raised from the tank $d$ to the tank $e$ by means of the pump $g$, $h$ is the water supply pipe, $j$ a ball cock and $k$ a distributer on the pipe $h$, $m$ is a pipe passing from the tank $e$ through the tank $a$ to the delivery pipe $n$. $o$ and $p$ are valves on the pipe $m$. $n'$ is a branch pipe from the pipe $m$ to the tank $d$, $q$ is a valve on the pipe $n'$, $r$ is a distributer on the pipe $m$. $s$ is a meter, $t$ is a draw off cock on the pipe $m$, $u$ is a drain to the tank $a$, $v$ a sump.

In the operation of softening water the valves $q$ and $o$ and the cock $t$ being closed, the hard water enters the pipe $h$ and is distributed by the distributer $k$. The water passes through the tank $a$ softening substance $b$ into the pipe $m$ by the distributer $r$ and flows through the meter $s$ to delivery pipe $n$. For the purpose of agitating, regenerating and cleansing the softening material the valves $p$ and $j$ are closed and the tank $d$ is filled from the tank $a$ by the valve $q$. When the tank $d$ is full the valve $q$ is closed and the necessary quantity of salt is placed in the tank $d$ and dissolved in the water. This salt solution is then pumped into the tank $e$, when this tank is full the valve $o$ is opened fully to allow the salt solution to pass rapidly through the distributer $r$ upward through the softening substance $b$ which thoroughly agitates the same. As soon as the tank $e$ is empty the valve $o$ is closed and the valve $j$ opened by hand and the cock $t$ opened to such an extent that the water passed through the tank $a$ in 10 hours is equal to about $2\frac{1}{2}$ times the volume of the tank $e$. After the passage of the salt solution and clear water downward, the filter will be completely regenerated and washed free from the mixed chlorids, when by closing the cock $t$ and opening the valve $p$ the softening process will proceed as previously described.

In the operation of softening water in the pressure system the valves $q'$ and $o$ and the cock $t$ are closed, the hard water enters the pipe $h$ and is distributed by the distributer $k$. The water passes through the tank $a$ softening substance $b$ into the pipe $m$ by the distributer $r$ and flows through the meter $s$ to the delivery pipe $n$.

In the process of agitating regenerating and cleansing the softening substance in the pressure apparatus the tank $d$ is filled from the supply pipe $h$ through the valve $q'$ and the necessary quantity of salt dissolved in this water. The valves $q'$ and $j'$ are then closed and the salt solution pumped up into the tank $e$, when the tank $e$ is filled and the tank $d$ is empty the valves $o$ and $q'$ are opened so that as the salt solution passes from the tank $e$ into the tank $a$ upward through the softening substance $b$ water is discharged from $a$ into $d$. This water can be used for dissolving the salt for the next regeneration. When $d$ has been filled all the solution has passed from the tank $e$ through the softening substance $b$. Valves $q'$ and $o$ are then closed and the valve $j'$ opened, the air cock $w$ on the pipe $w'$ is then opened to release any air that is carried into the filter in solution in the water and liberated during the process of filtration and remains open until a continuous stream of water flows from it. $w$ is then closed and $t$ opened to the extent stated with reference to the gravity apparatus. After 10 hours running the filter will be regenerated and completely washed and can be put into operation by closing $t$ and opening $p$.

In both cases the tank $a$ can be completely emptied by the capped bend $u$ when access to the interior of the plant is required.

In the pressure type Fig. 2, a manhole $y$ is provided to give access to the softening substance and in both cases fine strainers $z$ are fitted to both salt tanks to prevent any foreign matter from clogging the holes in the distributer $r$.

With apparatus made in accordance with this invention the salt solution is used for agitating in addition to regenerating the softening substance, by upward flow of the salt solution. Further with apparatus made in accordance with this invention there is a great reduction in the quantity of waste water and an increased efficiency of the apparatus is attained due to more effective regeneration. The softening substance is always completely immersed and does not accumulate air bubbles which would reduce the efficiency of the process and apparatus.

The plant can be operated from the ground level.

What I claim and desire to secure by Letters Patent is:—

The apparatus for softening water and for agitating or regenerating and cleansing the water softening material used in the process comprising a water softening tank, water softening material in the tank, a bed of gravel in the tank, a low level salt tank, and a high level salt tank, means for raising brine from the low level tank to the high level tank and means for conveying brine from the high level tank to the bottom of the water softening tank, means for filling the water softening tank with fresh water and distributing it within the tank, means for emptying the water softening tank through its bottom whereby the brine is first passed rapidly upward through the gravel and softening material to agitate the material and then passed downward through the material slowly, the softening material being washed free from brine by the passage of clear water following immediately after the brine in such volume that the water passing through the tank in ten hours is about equal to two and a half times the volume of the high level tank.

In testimony whereof I have signed my name to this specification in the presence of two subscribing witnesses.

HAROLD JOSEPH WHEATON.

Witnesses:
 E. A. MORLEY,
 A. HARRISON.